United States Patent [19]

Lysen

[11] Patent Number: 5,583,493
[45] Date of Patent: Dec. 10, 1996

[54] PROCESS AND APPARATUS FOR THE REMOTE POLLING OF MEASURING POINTS

[75] Inventor: Heinrich Lysen, Garching, Germany

[73] Assignee: Pruftechnik Dieter Busch AG, Ismaning, Germany

[21] Appl. No.: 296,501

[22] Filed: Aug. 26, 1994

[30] Foreign Application Priority Data

Aug. 27, 1993 [DE] Germany ............... 43 28 932.0

[51] Int. Cl.$^6$ ................................. G08C 19/16
[52] U.S. Cl. ................. 340/870.01; 340/870.02; 340/870.06; 340/870.11; 340/825.57; 340/825.77
[58] Field of Search .............. 340/870.11, 870.06, 340/825.04, 825.06, 825.08, 825.57, 825.77, 870.01, 870.02

[56] References Cited

U.S. PATENT DOCUMENTS

| | | | |
|---|---|---|---|
| 4,494,115 | 1/1985 | Gholson | 340/825.57 |
| 4,638,480 | 1/1987 | Darton | 340/870.11 |
| 4,933,833 | 6/1990 | Petroff | 340/825.08 |
| 5,223,826 | 6/1993 | Amou et al. | 340/825.57 |
| 5,243,338 | 9/1993 | Brennan, Jr. et al. | 340/870.02 |
| 5,252,967 | 10/1993 | Brennan et al. | 340/870.02 |
| 5,353,018 | 10/1994 | McKechnie et al. | 340/825.57 |
| 5,428,343 | 6/1995 | Kikuchi et al. | 340/825.08 |

FOREIGN PATENT DOCUMENTS

| | | |
|---|---|---|
| 2132349 | 1/1973 | Germany . |
| 3336290 | 6/1984 | Germany . |

OTHER PUBLICATIONS

Helmut Steffes, *Wählimpulse Schalter*, Funkschau, No. 1, 105–108, No. 2, 89–90, 1991.

*Primary Examiner*—Jeffery Hofsass
*Assistant Examiner*—Ashok Mannava
*Attorney, Agent, or Firm*—Kirkpatrick & Lockhart LLP

[57] ABSTRACT

A process and a device for the remote interrogation of measuring points is offered that form at least one group belonging together spatially and that supply electric measuring signals that are supplied separately to a central evaluation station. The distinction of this process and this device according to the invention is that the measuring signals from each of the measuring points forming one group are supplied in each case via an associated signal transmission device, preferably one (if necessary two-wire) line first to a network device assigned to the respective group, which holds the measuring signals receive from its measuring points for successive switching to its input and that for each network device the measuring signals are switched through control signals led via its input in a predetermined sequence to its input which is connected directly or indirectly with an input of the central evaluation station.

4 Claims, 1 Drawing Sheet

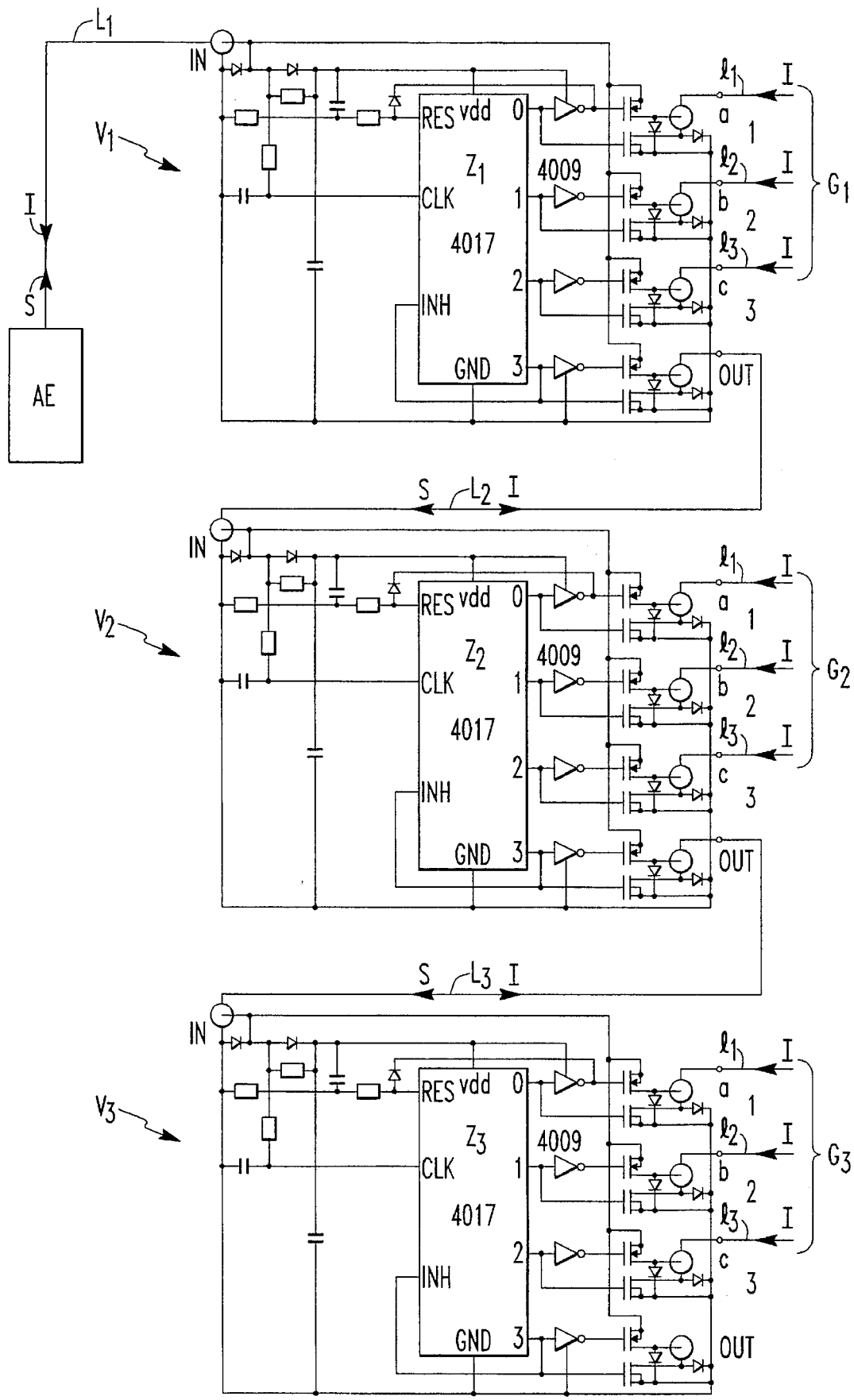

5,583,493

PROCESS AND APPARATUS FOR THE REMOTE POLLING OF MEASURING POINTS

BACKGROUND OF THE INVENTION

The invention refers to a process according to the preamble of Patent Claim 1 and a device or apparatus for the implementation of this process according to the preamble of Patent Claim 2.

The known processes and devices of this type are designed so that each individual measuring point is connected with the central evaluation station, e.g., a data processing device with a monitor, via a separate transmission line used by it only and the individual measuring points are interrogated or polled one after the other via the lines at the location of the evaluation station.

This state of the art requires a very large installation expenditure.

The problem forming the basis for the invention is to create a process according to the preamble of Patent Claim 1 that makes possible reliable interrogation of the individual measuring points with a much lower installation expenditure than the above-mentioned processes required for its realization and a device for the implementation of this process.

The problem above is solved with the object of Patent Claim 1 and with the object of Patent Claim 2.

With the process according to the invention, only one single line with a few wires is required for the longest link from the group of measuring points belonging together to the central evaluation station, since the measuring points of this group are assembled at the network device which, controlled from the central evaluation station, produces the connection to the individual measuring points in a predetermined sequence, whereby the network device is connected with an output of the central evaluation station, for which a single line with a few wires, in principle with only two, is sufficient.

Even in cases when there are several groups of measuring points belonging together, only one single cable with these few wires is required between these groups and/or between the individual network devices assigned to them in each case and one of these network devices to the central evaluation station when operating according to the process according to the invention.

Patent Claim 2 is concerned with a preferred design of the process according to Patent Claim 1.

Patent Claim 3 is concerned with a device suited for implementation of the process according to the invention and Patent claim 4 refers to preferred designs of the device according to Patent Claim 3.

DESCRIPTION OF THE PREFERRED EMBODIMENT

The invention will be described in more detail below with the help of the drawing using a design example. The only figure in the drawing depicts the circuit diagram of a device according to the invention for the implementation of the process according to the invention, having three network devices $V_1$, $V_2$, and $V_3$.

Each of the network devices $V_1$–$V_3$ in each case has a decimal counter $Z_1$–$Z_3$ (e.g. of type 4014) wired in the way shown in the drawing so that the circuit configuration operates like a multiplexer with four parallel inputs "a", "b", "c" and "out" and with the serial terminal "IN" to lines $L_1$ or $L_2$ or $L_3$.

Switch signals S are transmitted on Lines $L_1$ $L_2$, $L_3$ from the central evaluation station AE, e.g. a program-controlled data processing system possibly having a monitor, in the manner discussed in more detail in the following text, first to the first network device $V_1$ connected directly to the evaluation station, then through this to the second network device $V_2$, and finally through the first and the second network device to the third network device $V_3$. In this respect, the terminals IN of the network devices $V_1$, $V_2$, $V_3$ represent inputs for the switch signals S.

Measuring signals I are also transmitted via Lines $L_1$–$L_3$, however, from the measuring points to the evaluation station AE and for these the terminals IN of the individual network devices $V_1$, $V_2$, and $V_3$ represent outputs. The transferring or establishing of a connection between the evaluation station AE and in turn with the different measuring points, first of group $G_1$, then of the second group $G_2$, and then of the third group $G_3$, as well as the transmission of the measuring signals I from the respective measuring point to the evaluation station AE takes place as follows:

Starting from the idle state, in which no connection exists between the evaluation station AE and the measuring points, 1, 2, 3 of the three groups $G_1$, $G_2$, and $G_3$, the abrupt application of—relatively low-resistance—direct current from the evaluation station AE to the terminal IN of the first network device $V_1$ causes, due to the special protection circuit of the counter $Z_1$ in the manner shown in the drawing, a connection to be established through the network device $V_1$ from the evaluation station AE to only its input "a", so that the direct current from the evaluation station AE is now applied to this input. This direct current is very resistant so that the state is reflected at the measuring point in the size of the load-dependent current, that flows from the measuring point via the terminal a from $V_1$ to evaluation station AE, and this current represents measuring signal I. The current measuring signal I can have any waveform.

Now, when the direct current from AE applied to IN of $V_1$ is abruptly interrupted for a short time, the connection to input a from $V_1$ is interrupted, due to the special protective circuit of $Z_1$ shown in the drawing, and instead of this is established to input b of $V_1$, because the counter $Z_1$ is switched through in each case to the next terminal in the sequence a, b, c, out due to this voltage interruption. In the transferring from a to b and finally to c, another one of the three measuring points 1, 2, 3 of the group $G_1$ is connected to the evaluation station AE. The voltage interruption that follows on the terminal IN from $V_1$ is transmitted on, however via the terminal out of $V_1$ to the terminal IN of $V_2$ as an abrupt voltage rise and now causes the establishment of a connection from IN to $V_2$ to its input a, so that now the measuring point 1 of group $G_2$ is switched through via $V_2$ through $V_1$ to the central evaluation unit AE. Each additional voltage interruption from AE subsequently has an effect on only $V_2$ because, due to the special protective circuit of the counter $Z_1$ from $V_1$ using the method shown in the drawing, this counter discontinues switching as soon as the connection between IN and out of $V_1$ has been established. The following voltage interruptions and/or switch signals S now successively affect the transfer of the connection first from a to b, then from b to c and finally from c to out of $V_2$ in the same manner as this occurred previously in the case of $V_1$, so that now in turn measuring points 2 and 3 of group $G_2$ are connected with the central evaluation station AE and their measuring signals I can be supplied to these and after the transfer from c to out of $G_2$, the additional switch signals S from AE through $V_1$ and $V_2$ go through and the same effects are produced on $V_3$ as on $V_1$ and $V_2$ previously.

With the help of the input-side time constants set in $V_1$, $V_2$ and $V_3$, the result is that all network devices are reset to the idle state when the voltage from AE fails for a longer period of time. In this idle state, all network devices $V_1$–$V_3$ are prepared for the establishment of a connection in each case to the first input a, as soon as the first abrupt voltage rise occurs at its terminal IN.

Thus, it is clear that all nine measuring points (three of group $G_1$, three of group $G_2$, and three of group $G_3$) can be successively interrogated through switch signal S from AE, whereby the long distance between the measuring point groups and the evaluation station AE are bridged in each case by a single, if necessary, two-wire line $L_1$, $L_2$ and $L_3$ and each measuring point requires transmission line $l_1$, $l_2$ and $l_3$, provided for it only, only for the short link to the network device $V_1$ assigned to it.

Instead of cables, in principle once-channel transmission media, such as radio, light beam, etc. can also be used, whereby the cable connection is of special importance due to its immunity to faults.

The measuring points in the design example described could be, for example, measuring points on three machines to which one of the three network devices $V_1$, $V_2$ and $V_3$ is assigned in each case, so that the measuring points located on the respective machine must be led in each case only to the network point also located on the machine and in each case only one single—if necessary a two-wire—line is required for the three measuring points from the network device the evaluation point AE, whereby only the last group $G_3$ uses its line $L_3$ alone, while wiring runs $L_2$ and $L_1$ are used twice or three times since $L_2$ also transmits the signals that come from $L_3$ and $L_1$ also transmits the signals from $L_2$.

As compared to the known single connection of each measuring point to the central evaluation station AE, the required expenditure for transmission media, i.e. for the use of cables, in particular the installation expenditure, is decreased substantially and, in addition, operations security is increased considerably with the invention.

The design example was described above for three measuring points each for each network device $V_1$, $V_2$, $V_3$. It is clear that the number of measuring points for each network device can be configured in practically any way within broad limits, if necessary, using several interconnected counters, also that the number of network devices can be selected as desired within broad limits and also that the number of measuring points can vary from network device to network device.

As already stated, in the design example described transfer occurs with switch signals S in the form of voltage interruption and/or voltage jumps and the transmission of information takes place, so to speak, as a status signal in the form of current signals. In principle, however, other signal forms could also be used for the switch signal and for the information signal, e.g. coded signals, with network devices designed accordingly.

What I claim is:

1. A method for the remote interrogation of measuring points that form at least one group belonging together spatially and that supply electric measuring signals with respect to specified states of monitored machines, whereby said electric measuring signals are separated from each other and are supplied to a central evaluation station, comprising:

supplying said measuring signals from each of said measuring points forming a group via a signal transmission device to a first network device assigned to said group, said first network device having one terminal for each measuring point, and having a communication means, said communication means of said first network device being capable of both receiving information and transmitting information;

switching said measuring signals of said individual measuring points for said first network device in a predetermined sequence from said terminals to said communication means of said first network device in response to control signals transmitted from a communication means of said central evaluation station, said communication means of said central evaluation station being capable of both receiving information and transmitting information to the communication means of said first network device;

supplying measuring signals from measuring points to a second network device, each of said first and second network devices having a said group of said measuring points, said first and second network devices being connected to each other in a defined sequence and wherein said first network device having an additional terminal not used for receiving a said measuring signal, and wherein said first and second network devices each further comprise a communication means;

establishing a serial connection between said additional terminal of said first network device and said communication means of said second network device after a last said measuring signal is switched from said terminal of said first network device to said communication means of said first network device; and connecting said first network device with its said communication means to said communication means of said central evaluation station.

2. An apparatus for transmitting electric measuring signals from several measuring points via a transmission device to a central evaluation station having a communication means, said communication means of said central evaluation station suitable for both receiving information and for transmitting information, comprising:

a network device, said network device having separate terminals in communication with each of said measuring points and said network device having a communication means connected to said communication means of said central evaluation station, said communication means of said network device being suitable for both receiving information and for transmitting information and said network device having a switching device that responds to electric control signals generated by said communication means of said central evaluation station so as to connect said terminals to said communication means of said network device one after the other, so that said measuring signal from another said measuring point is applied successively to said communication means of said network device during time intervals between said control signals during any one interrogation cycle; and said switching device has an electronic counter having a number of digits that exceeds the number of said measuring points belonging to said group by at least one place value, and said counter has a counting output connected with an additional terminal of said network device and said counter has additional counting outputs that respond sooner than said counting output during the counting function, connected in each case, via said terminals, to a measuring point whereby a power supply connection of said counter forms said communication means of said network device and said counter is wired from said communication means of said network device such that said counter is incremented by one more digit with a pulsed interruption or a clear reduction of the power supply voltage applied to said communication means of said network device and when the last said digit conducted to the communication means of said network device is reached, the continued counting stops so that any following pulsed interruptions or reductions are communicated via said counting output to another network device.

3. The apparatus in accordance with claim 2, wherein said apparatus has a plurality of network devices; said measuring points are interconnected with said terminals of said network devices and wherein said additional terminal of one said network device is interconnected with said communication means of another said network device and said communication means of one said network device is interconnected with said communication means of the central evaluation station, in each case via a cable.

4. The apparatus in accordance with claim 3, wherein the cables are twin-wire cables.

* * * * *